(12) United States Patent
Muta et al.

(10) Patent No.: US 7,918,762 B2
(45) Date of Patent: Apr. 5, 2011

(54) POWER OUTPUT APPARATUS, CONTROL METHOD OF POWER OUTPUT APPARATUS, AND VEHICLE EQUIPPED WITH POWER OUTPUT APPARATUS

(75) Inventors: Koichiro Muta, Okazaki (JP); Eiji Masuda, Toyota (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 805 days.

(21) Appl. No.: 11/920,772

(22) PCT Filed: Feb. 6, 2007

(86) PCT No.: PCT/JP2007/052433
§ 371 (c)(1),
(2), (4) Date: Nov. 20, 2007

(87) PCT Pub. No.: WO2007/094278
PCT Pub. Date: Aug. 23, 2007

(65) Prior Publication Data
US 2009/0105043 A1 Apr. 23, 2009

(30) Foreign Application Priority Data
Feb. 16, 2006 (JP) ................. 2006-039919

(51) Int. Cl.
*B60K 6/00* (2007.10)
(52) U.S. Cl. ........................................ 477/97
(58) Field of Classification Search ........ 477/97
See application file for complete search history.

(56) References Cited

U.S. PATENT DOCUMENTS

| 5,818,116 A | 10/1998 | Nakae et al. |
| 5,936,312 A | 8/1999 | Koide et al. |
| 6,155,954 A | 12/2000 | Itoyama et al. |
| 6,522,024 B1 | 2/2003 | Takaoka et al. |
| 7,062,916 B2* | 6/2006 | Kamijo et al. ........... 60/706 |
| 2004/0097327 A1 | 5/2004 | Loeffler et al. |
| 2009/0012665 A1* | 1/2009 | Brennan et al. .......... 701/22 |

FOREIGN PATENT DOCUMENTS

| JP | 9-308012 | 11/1997 |
| JP | 10-184431 | 7/1998 |
| JP | 2811309 | 8/1998 |
| JP | 2000-097070 | 4/2000 |
| JP | 2005-45862 A | 2/2005 |

* cited by examiner

*Primary Examiner* — Sherry Estremsky
(74) *Attorney, Agent, or Firm* — Kenyon & Kenyon LLP

(57) ABSTRACT

The drive control of the invention executed in a vehicle sets a correction coefficient keg, based on an intake air temperature and an atmospheric pressure reflecting the density of intake air supplied to an engine, and multiplies a power demand required for the vehicle by the set correction coefficient keg to specify a target engine power, which is to be output from the engine. The engine and two motors are then controlled to ensure output of the specified target engine power from the engine and output of a torque demand, which depends upon an accelerator opening. The varying density of the intake air may cause output of excessive power from the engine or output of insufficient power from the engine. A battery is charged or discharged to compensate for the excessive power output from the engine or for the insufficient power output from the engine. The drive control of the invention effectively deals with the environmental change and prevents the battery from being excessively charged with an unexpectedly high electric power or from being excessively discharged to supply an unexpectedly high electric power.

15 Claims, 8 Drawing Sheets

POWER OUTPUT APPARATUS, CONTROL METHOD OF POWER OUTPUT APPARATUS, AND VEHICLE EQUIPPED WITH POWER OUTPUT APPARATUS

This is a 371 national phase application of PCT/JP2007/052433 filed 6 Feb. 2007, which claims priority to Japanese Patent Application No. 2006-039919, filed 16 Feb. 2006, the contents of which are incorporated herein by reference.

TECHNICAL FIELD

The present invention relates to a power output apparatus, a control method of the power output apparatus, and a vehicle equipped with the power output apparatus.

BACKGROUND ART

One typical configuration of proposed power output apparatus mounted on a vehicle has an engine, a planetary gear unit including a carrier linked to an output shaft of the engine and a ring gear linked to an axle of the vehicle, a motor MG1 inputting and outputting power from and to a sun gear of the planetary gear unit, a motor MG2 inputting and outputting power from and to the axle, and a battery being capable of transmitting electric power from and to the motors MG1 and MG2 (see, for example, Japanese Patent Laid-Open Gazette No. H09-308012). This prior art power output apparatus specifies a torque command to be output to the ring gear based on the driver's depression amount of an accelerator pedal and the rotation speed of the ring gear, and calculates the output energy to be output from the engine by summing up the product of the specified torque command and the rotation speed of the ring gear and a charge-discharge electric power that is actually charged into or discharged from the battery. A target rotation speed and a target torque of the engine are set as an optimum drive point to ensure efficient output of the calculated output energy from the engine. A torque command of the motor MG1 is specified to ensure the operation of the engine at the set target rotation speed. A torque command of the motor MG2 is specified by subtracting an amount of torque output from the engine to the ring gear via the planetary gear unit from the specified torque command to be output to the ring gear. The prior art power output apparatus then controls the engine to be driven at a target drive point defined by the combination of the target rotation speed and the target torque, while controlling the motors MG1 and MG2 to be driven with the respectively set torque commands.

DISCLOSURE OF THE INVENTION

The functions of this prior art power output apparatus for attaining the stationary driving state of the vehicle cause no problems in the standard environmental conditions. In the non-standard environmental conditions, however, the functions of the power output apparatus may cause the battery to be charged with an unexpected level of charge-discharge electric power or to be discharged to supply an unexpected level of charge-discharge electric power. For example, in the circumstance of the very low outside temperature, the lower temperature leads to the higher density of the air. The control of the engine in the very low temperature with the same setting of the target drive point as the setting at a standard temperature (for example, 25° C.) causes output of an unexpectedly large power from the engine. This results in excessive charge of the battery with an unexpectedly high electric power. In another example, in the circumstance of the high altitude, the lower atmospheric pressure leads to the lower density of the air. The control of the engine at the high altitude (in the low atmospheric pressure) with the same setting of the target drive point as the setting in a standard atmospheric pressure (1 atmospheric pressure) at the low altitude causes output of an unexpectedly small power from the engine. This results in excessive discharge of the battery to supply an unexpectedly high electric power.

The power output apparatus of the invention, the control method of the power output apparatus, and the vehicle equipped with the power output apparatus thus aim to adequately deal with the environmental change. The power output apparatus of the invention, the control method of the power output apparatus, and the vehicle equipped with the power output apparatus also aim to prevent an accumulator unit from being excessively charged with an unexpectedly high electric power or from being excessively discharged to supply an unexpectedly high electric power.

In order to attain at least part of the above and the other related objects, the power output apparatus, the control method of the power output apparatus, and the vehicle equipped with the power output apparatus of the invention have the configurations discussed below.

The present invention is directed to a power output apparatus that outputs power to a driveshaft. The power output apparatus includes: an internal combustion engine; an electric power-mechanical power input output mechanism that is connected with an output shaft of the internal combustion engine and with the driveshaft and inputs and outputs power from and to the output shaft and the driveshaft through input and output of electric power and mechanical power; a motor that is capable of inputting and outputting power from and to the driveshaft; an accumulator unit that transmits electric power to and from the electric power-mechanical power input output mechanism and the motor; a charge-discharge power demand setting module that sets a charge-discharge power demand, which is to be charged into or discharged from the accumulator unit; an input/output limits setting module that sets input and output limits of the accumulator unit as chargeable and dischargeable electric powers in and from the accumulator unit; an air density-affecting physical quantity detection unit that detects a physical quantity, which affects density of the air taken into the internal combustion engine; a driving force demand setting module that sets a driving force demand required for the driveshaft; a target drive point setting module that sets a target drive point of the internal combustion engine, based on the set driving force demand, the set charge-discharge power demand, and the detected air density-affecting physical quantity; and a control module that controls the internal combustion engine, the electric power-mechanical power input output mechanism, and the motor to drive the internal combustion engine at the set target drive point in a range of the input limit and the output limit and to ensure output of a driving force equivalent to the set driving force demand to the driveshaft.

The power output apparatus of the invention sets the target drive point of the internal combustion engine, based on the driving force demand that is required for the driveshaft, the charge-discharge power demand that is to be charged into or discharged from the accumulator unit, and the air density-affecting physical quantity that affects the density of the air taken into the internal combustion engine. The internal combustion engine, the electric power-mechanical power input output mechanism, and the motor are then controlled to drive the internal combustion engine at the target drive point in the range of the input limit and the output limit, which are set as the chargeable and dischargeable electric powers in and from the accumulator unit, and to ensure output of the driving force equivalent to the set driving force demand to the driveshaft. Namely the control of the power output apparatus is based on the target drive point of the internal combustion engine set by taking into account the air density-affecting physical quantity. This arrangement ensures the adequate control in response to a variation in air density-affecting physical quantity and desirably prevents the accumulator unit from being excessively charged with an unexpectedly high electric power or from being excessively discharged to supply an unexpectedly high electric power. Namely the technique of the invention effectively deals with the environmental change.

In one preferable embodiment of the power output apparatus of the invention, the air density-affecting physical quantity detection unit includes a temperature measurement unit that measures temperature of the air taken into the internal combustion engine and an atmospheric pressure measurement unit that measures atmospheric pressure. This arrangement ensures the adequate response to the varying temperature of the intake air supplied to the internal combustion engine, as well as to the varying atmospheric pressure.

In another preferable embodiment of the power output apparatus of the invention, the target drive point setting module specifies a tentative power demand to be output from the internal combustion engine corresponding to the set driving force demand and the set charge-discharge power demand, corrects the specified tentative power demand with a correction factor based on the detected air density-affecting physical quantity to set a target power, and sets the target drive point as a combination of a target rotation speed and a target torque of the internal combustion engine based on the set target power and an efficient operation restriction for efficient operation of the internal combustion engine. In this case, when the detected air density-affecting physical quantity is in a preset first range including a standard quantity, the target drive point setting module may set the tentative power demand to the target power. When the detected air density-affecting physical quantity is out of a preset second range including a standard quantity, the target drive point setting module may set the target power with specification of the detected air density-affecting physical quantity as a boundary of the preset second range. Namely the technique of this application specifies the preset first range including the standard quantity to the dead zone, while specifying the preset second range including the standard quantity to the upper limit and the lower limit. This arrangement effectively eliminates the excessive influence on the air density-affecting physical quantity.

In still another preferable embodiment of the power output apparatus of the invention, the control module sets a target operation condition of the electric power-mechanical power input output mechanism to drive the internal combustion engine at a rotation speed of the set target drive point, and controls the electric power-mechanical power input output mechanism to be driven in the set target operation condition. In this case, the power output apparatus may include a rotation speed detection unit that detects a rotation speed of the internal combustion engine, and the control module may perform feedback control of the electric power-mechanical power input output mechanism to cancel out a difference between the rotation speed of the set target drive point and the detected rotation speed of the internal combustion engine. This arrangement readily attains the optimum operation of the internal combustion engine at the rotation speed of the target drive point.

In still another preferable embodiment of the power output apparatus of the invention, the power output apparatus includes a charge-discharge electric power detection unit that detects a charge-discharge electric power, which is actually charged into or discharged from the accumulator unit, and the charge-discharge power demand setting module sets the charge-discharge power demand with a correction based on the detected charge-discharge electric power, upon satisfaction of a preset condition. In this case, the preset condition may be that the driveshaft is in a substantially steady driving state. This arrangement ensures adequate charge and discharge of the accumulator unit.

In still another preferable embodiment of the power output apparatus of the invention, the electric power-mechanical power input output mechanism includes: a three shaft-type power input output module that is linked to three shafts, the output shaft of the internal combustion engine, the driveshaft, and a rotating shaft, and inputs and outputs power from and to a residual one shaft based on powers input from and output to any two shafts among the three shafts; and a generator that inputs and outputs power from and to the rotating shaft.

The present invention is directed to a vehicle equipped with the power output apparatus having any of the arrangements discussed above and outputting power to a driveshaft, and has an axle linked to the driveshaft. The power output apparatus basically includes: an internal combustion engine; an electric power-mechanical power input output mechanism that is connected with an output shaft of the internal combustion engine and with the driveshaft and inputs and outputs power from and to the output shaft and the driveshaft through input and output of electric power and mechanical power; a motor that is capable of inputting and outputting power from and to the driveshaft; an accumulator unit that transmits electric power to and from the electric power-mechanical power input output mechanism and the motor; a charge-discharge power demand setting module that sets a charge-discharge power demand, which is to be charged into or discharged from the accumulator unit; an input/output limits setting module that sets input and output limits of the accumulator unit as chargeable and dischargeable electric powers in and from the accumulator unit; an air density-affecting physical quantity detection unit that detects a physical quantity, which affects density of the air taken into the internal combustion engine; a driving force demand setting module that sets a driving force demand required for the driveshaft; a target drive point setting module that sets a target drive point of the internal combustion engine, based on the set driving force demand, the set charge-discharge power demand, and the detected air density-affecting physical quantity; and a control module that controls the internal combustion engine, the electric power-mechanical power input output mechanism, and the motor to drive the internal combustion engine at the set target drive point in a range of the input limit and the output limit and to ensure output of a driving force equivalent to the set driving force demand to the driveshaft.

The vehicle of the invention is equipped with the power output apparatus having any of the arrangements described above and accordingly exerts the similar effects to those of the power output apparatus of the invention. For example, this arrangement ensures the adequate control in response to a variation in air density-affecting physical quantity and desirably prevents the accumulator unit from being excessively charged with an unexpectedly high electric power or from being excessively discharged to supply an unexpectedly high electric power. Namely the technique of the invention effectively deals with the environmental change.

The present invention is also directed to a control method of a power output apparatus. The power output apparatus includes: an internal combustion engine; an electric power-mechanical power input output mechanism that is connected with an output shaft of the internal combustion engine and with the driveshaft and inputs and outputs power from and to the output shaft and the driveshaft through input and output of electric power and mechanical power; a motor that is capable of inputting and outputting power from and to the driveshaft; and an accumulator unit that transmits electric power to and from the electric power-mechanical power input output mechanism and the motor. The control method sets a target drive point of the internal combustion engine, based on a driving force demand that is required for the driveshaft, a charge-discharge power demand that is to be charged into or discharged from the accumulator unit, and an air density-affecting physical quantity that affects density of the air taken into the internal combustion engine. The control method controls the internal combustion engine, the electric power-mechanical power input output mechanism, and the motor to drive the internal combustion engine at the set target drive point in a range of an input limit and an output limit, which are set as chargeable and dischargeable electric powers in and from the accumulator unit, and to ensure output of a driving force equivalent to the set driving force demand to the driveshaft.

In one preferable embodiment of the control method of a power output apparatus of the invention, the control method sets the target drive point of the internal combustion engine, based on the driving force demand that is required for the driveshaft, the charge-discharge power demand that is to be charged into or discharged from the accumulator unit, and the air density-affecting physical quantity that affects the density of the air taken into the internal combustion engine. The internal combustion engine, the electric power-mechanical power input output mechanism, and the motor are then controlled to drive the internal combustion engine at the target drive point in the range of the input limit and the output limit, which are set as the chargeable and dischargeable electric powers in and from the accumulator unit, and to ensure output of the driving force equivalent to the set driving force demand to the driveshaft. Namely the control of the power output apparatus is based on the target drive point of the internal combustion engine set by taking into account the air density-affecting physical quantity. This arrangement ensures the adequate control in response to a variation in air density-affecting physical quantity and desirably prevents the accumulator unit from being excessively charged with an unexpectedly high electric power or from being excessively discharged to supply an unexpectedly high electric power. Namely the technique of the invention effectively deals with the environmental change.

In another preferable embodiment of the control method of a power output apparatus of the invention, the air density-affecting physical quantity includes temperature of the air taken into the internal combustion engine or atmospheric pressure. This arrangement ensures the adequate response to the varying temperature of the intake air supplied to the internal combustion engine, as well as to the varying atmospheric pressure.

In still another preferable embodiment of the control method of a power output apparatus of the invention, the control method specifies a tentative power demand to be output from the internal combustion engine corresponding to the driving force demand and the charge-discharge power demand, corrects the specified tentative power demand with a correction factor based on the air density-affecting physical quantity to set a target power, and sets the target drive point as a combination of a target rotation speed and a target torque of the internal combustion engine based on the set target power and an efficient operation restriction for efficient operation of the internal combustion engine. In this case, when the air density-affecting physical quantity is in a preset first range including a standard quantity, the control method may set the tentative power demand to the target power. When the air density-affecting physical quantity is out of a preset second range including a standard quantity, the control method may further set the target power with specification of the air density-affecting physical quantity as a boundary of the preset second range. Namely the technique of this application specifies the preset first range including the standard quantity to the dead zone, while specifying the preset second range including the standard quantity to the upper limit and the lower limit. This arrangement effectively eliminates the excessive influence on the air density-affecting physical quantity.

In still another preferable embodiment of the control method of a power output apparatus of the invention, the control method sets a target operation condition of the electric power-mechanical power input output mechanism to drive the internal combustion engine at a rotation speed of the set target drive point, and controls the electric power-mechanical power input output mechanism to be driven in the set target operation condition. In this case, the control method may perform feedback control of the electric power-mechanical power input output mechanism to cancel out a difference between the rotation speed of the set target drive point and the rotation speed of the internal combustion engine. This arrangement readily attains the optimum operation of the internal combustion engine at the rotation speed of the target drive point.

BEST MODES OF CARRYING OUT THE INVENTION

Figure 1:
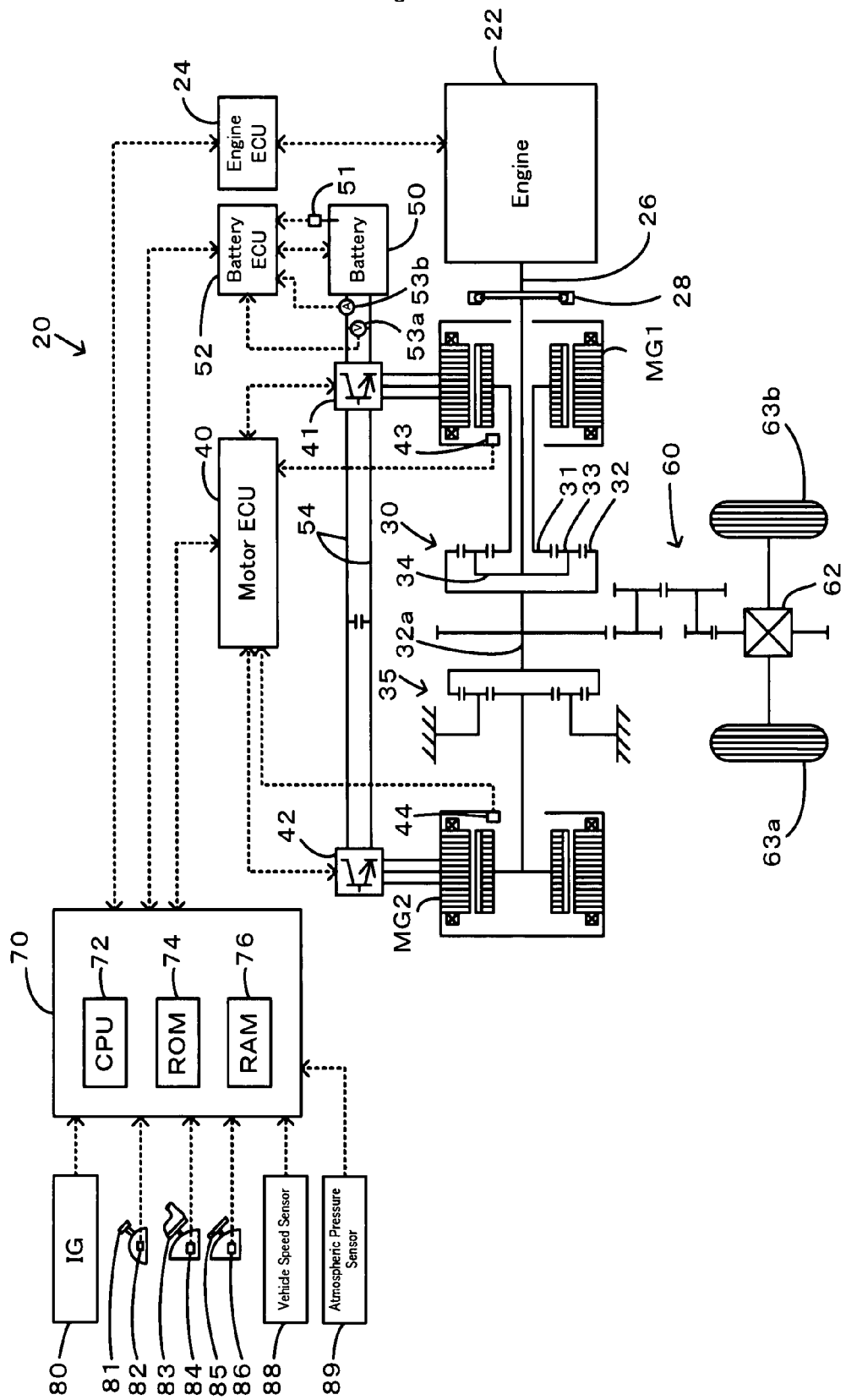
FIG. 1 schematically illustrates the configuration of a hybrid vehicle equipped with a power output apparatus in one embodiment of the invention.

One mode of carrying out the invention is discussed below as a preferred embodiment. FIG. 1 schematically illustrates the construction of a hybrid vehicle 20 with a power output apparatus mounted thereon in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

Figure 2:
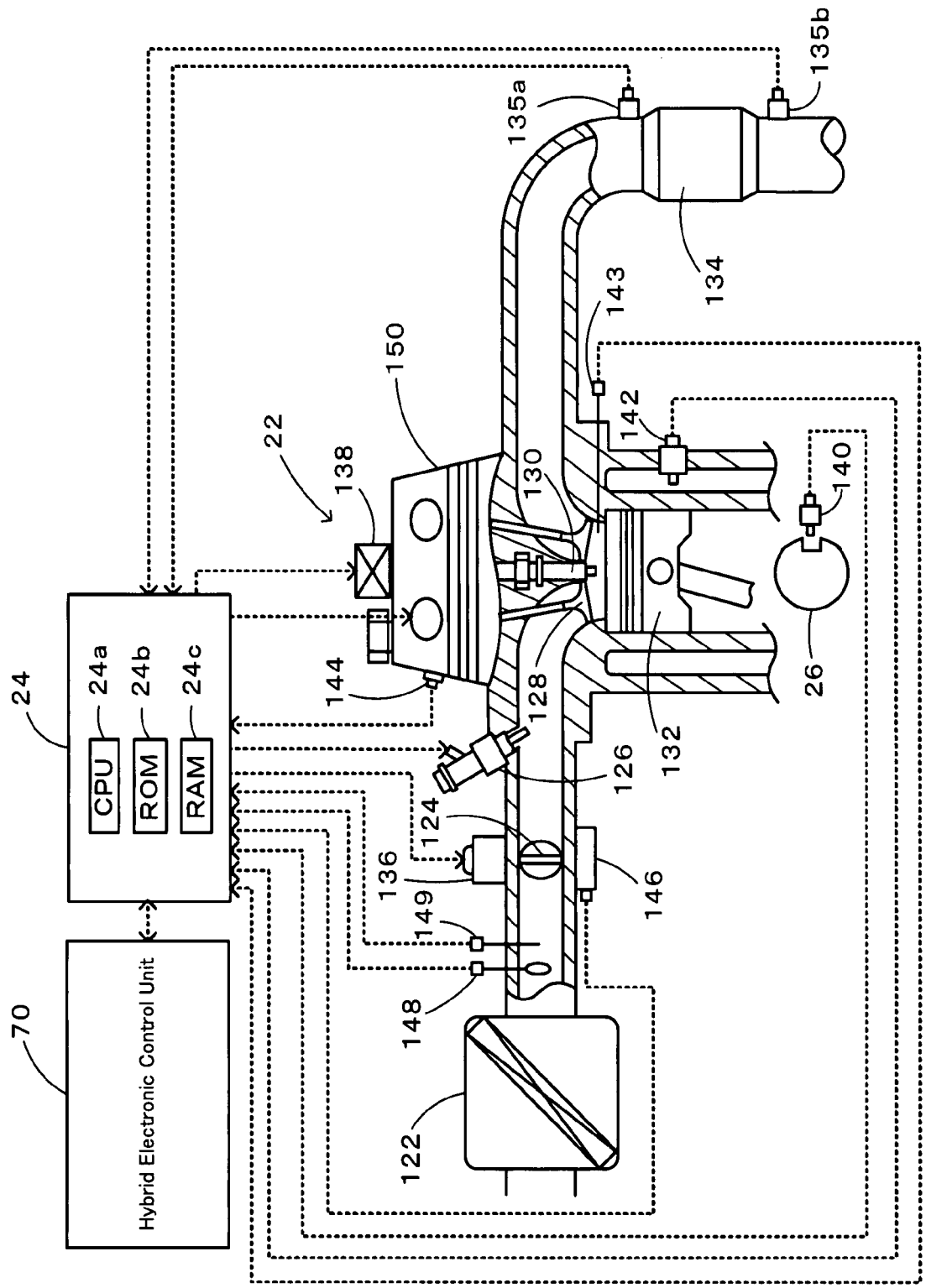
FIG. 2 schematically shows the structure of an engine mounted on the hybrid vehicle of the embodiment.

The engine 22 is an internal combustion engine that consumes a hydrocarbon fuel, such as gasoline or light oil, to output power. As shown in FIG. 2, the air cleaned by an air cleaner 122 and taken in via a throttle valve 124 is mixed with the atomized fuel injected by a fuel injection valve 126 to the air-fuel mixture. The air-fuel mixture is introduced into a combustion chamber via an intake valve 128. The introduced air-fuel mixture is ignited with spark made by a spark plug 130 to be explosively combusted. The reciprocating motions of a piston 132 by the combustion energy are converted into rotational motions of the crankshaft 26. The exhaust from the engine 22 goes through a catalytic conversion unit 134 (filled with three-way catalyst) to convert toxic components included in the exhaust, that is, carbon monoxide (CO), hydrocarbons (HC), and nitrogen oxides (NOx), into harmless components, and is discharged to the outside air.

The engine 22 is under control of an engine electronic control unit 24 (hereafter referred to as engine ECU). The engine ECU 24 is constructed as a microprocessor including a CPU 24a, a ROM 24b that stores processing programs, a RAM 24c that temporarily stores data, input and output ports (not shown), and a communication port (not shown). The engine ECU 24 receives, via its input port, diverse signals from various sensors that measure and detect the operating conditions of the engine 22. The signals input into the engine ECU 24 include a crank position from a crank position sensor 140 detected as the rotational position of the crankshaft 26, a cooling water temperature from a water temperature sensor 142 measured as the temperature of cooling water in the engine 22, an in-cylinder pressure Pin from a pressure sensor 143 located inside the combustion chamber, a cam position from a cam position sensor 144 detected as the rotational position of a camshaft driven to open and close the intake valve 128 and an exhaust valve for gas intake and exhaust into and from the combustion chamber, a throttle valve position from a throttle valve position sensor 146 detected as the opening or position of the throttle valve 124, an air flow meter signal AF from an air flow meter 148 located in an air intake conduit, an intake air temperature Ta from a temperature sensor 149 located in the air intake conduit, an air-fuel ratio AR from an air-fuel ratio sensor 135a, and an oxygen concentration from an oxygen sensor 135b. The engine ECU 24 outputs, via its output port, diverse control signals and driving signals to drive and control the engine 22. The signals output from the engine ECU 24 include driving signals to the fuel injection valve 126, driving signals to a throttle valve motor 136 for regulating the position of the throttle valve 124, control signals to an ignition coil 138 integrated with an igniter, and control signals to a variable valve timing mechanism 150 to vary the open and close timings of the intake valve 128. The engine ECU 24 establishes communication with the hybrid electronic control unit 70 to drive and control the engine 22 in response to control signals received from the hybrid electronic control unit 70 and to output data regarding the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control and management of a battery electronic control unit (hereafter referred to as battery ECU) 52. The battery ECU 52 inputs signals required for management and control of the battery 50, for example, an inter-terminal voltage (battery voltage) Vb between terminals of the battery 50 from a voltage sensor 53a located on the power line 54 connecting with an output terminal of the battery 50, a charge-discharge current Ib from a current sensor 53b located on the power line 54, and a battery temperature Tb from a temperature sensor 51 attached to the battery 50. The battery ECU 52 outputs data regarding the operating conditions of the battery 50 by communication to the hybrid electronic control unit 70 according to the requirements. The battery ECU 52 computes a remaining charge level or current state of charge (SOC) of the battery 50 from integration of the charge-discharge current Ib measured by the current sensor 53b, for the purpose of management and control of the battery 50. The battery ECU 52 also computes a charge-discharge electric power Pb that is actually charged into or discharged from the battery 50 as the product of the battery voltage Vb measured by the voltage sensor 53a and the charge-discharge current Ib measured by the current sensor 53b. A charge-discharge power demand Pb* is set to charge the battery 50 with a greater amount of electric power as the state of charge SOC of the battery 50 decreases, when the state of charge SOC is lower than a preset first reference value S1. The charge-discharge power demand Pb* is set to cause the battery 50 to discharge a greater amount of electric power as the state of charge SOC of the battery 50 increases, when the state of charge SOC is higher than a preset second reference value S2, which is higher than the preset first reference value S1. The charge-discharge power demand Pb* is set equal to 0 to cause neither charge nor discharge of the battery 50, when the state of charge SOC of the battery 50 is between the preset first reference value S1 and the preset second reference value S2.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, a vehicle speed V from a vehicle speed sensor 88, and an atmospheric pressure Pa from the atmospheric pressure sensor 89. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver Is step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 3:
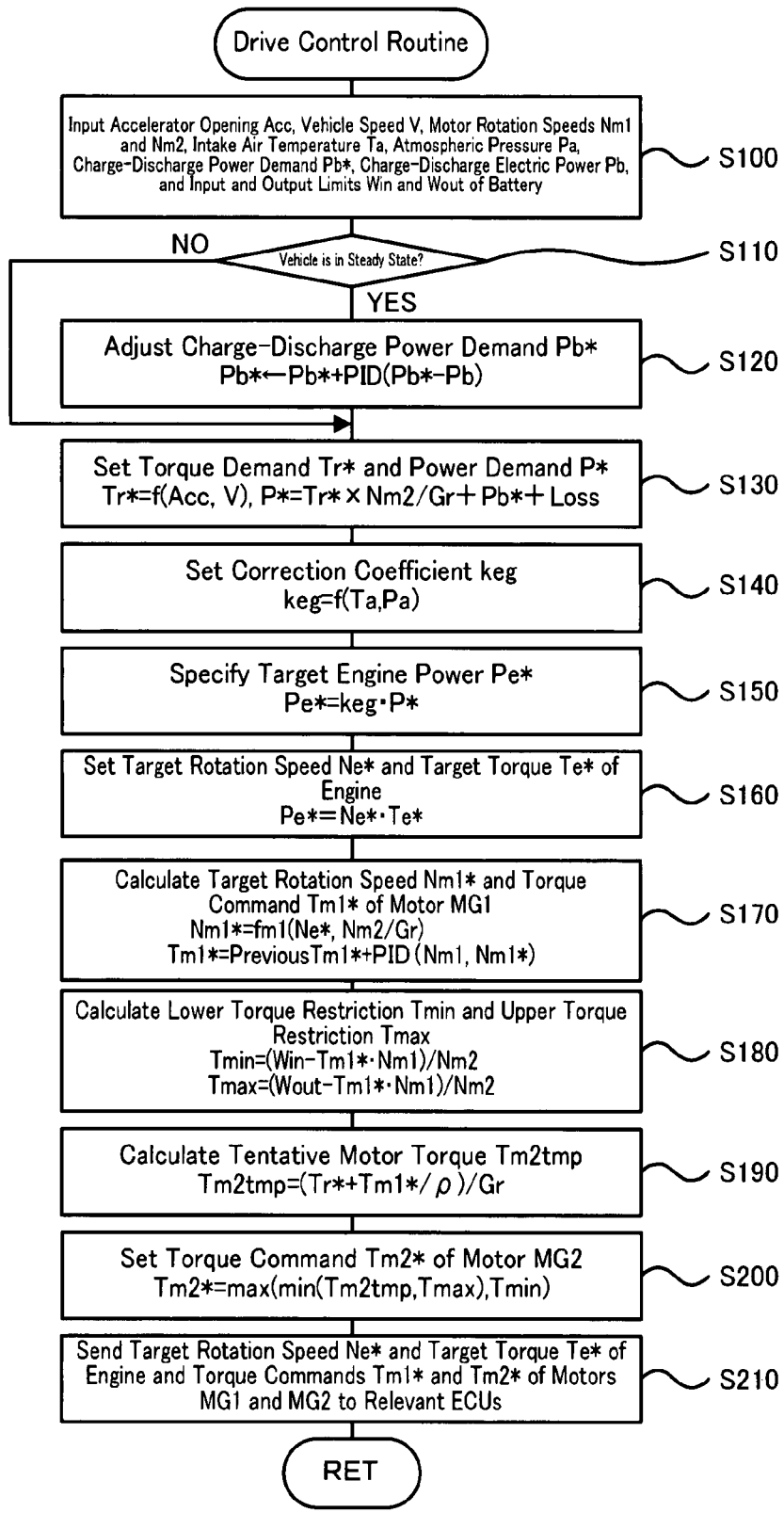
FIG. 3 is a flowchart showing a drive control routine executed by a hybrid electronic control unit mounted on the hybrid vehicle of the embodiment.

The description regards the operations of the hybrid vehicle 20 of the embodiment having the configuration discussed above. FIG. 3 is a flowchart showing a drive control routine executed by the hybrid electronic control unit 70 in the hybrid vehicle 20 of the embodiment. This drive control routine is performed repeatedly at preset time intervals, for example, at every several msec.

Figure 4:
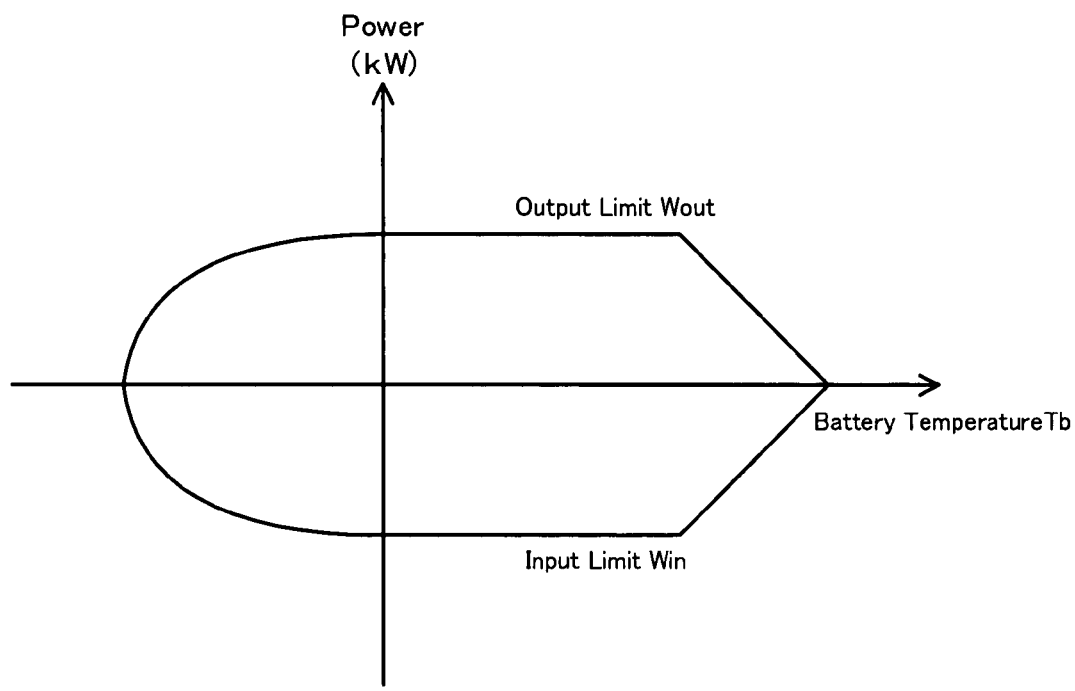
FIG. 4 shows variations of an input limit Win and an output limit Wout against battery temperature Tb of a battery.
Figure 5:
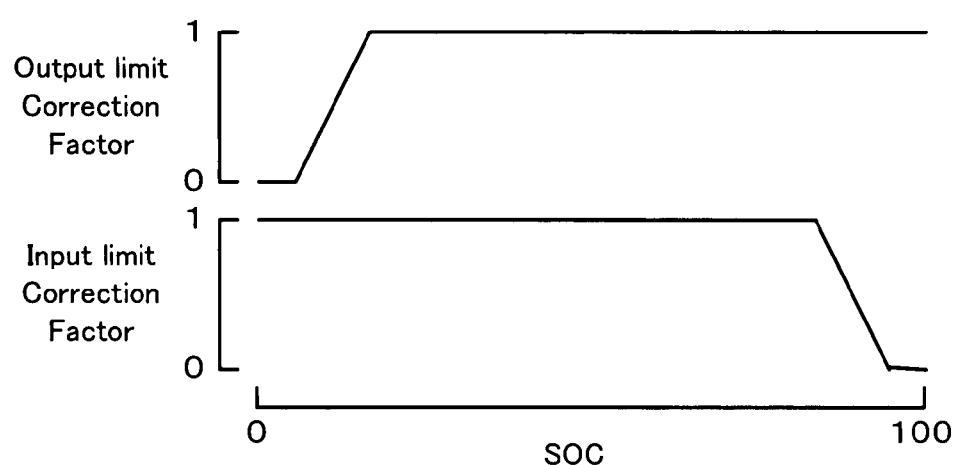
FIG. 5 shows variations of an input limit correction factor and an output limit correction factor against the state of charge SOC of the battery.

In the drive control routine of FIG. 3, the CPU 72 of the hybrid electronic control unit 70 first inputs various data required for control, that is, the accelerator opening Acc from the accelerator pedal position sensor 84, the vehicle speed V from the vehicle speed sensor 88, rotation speeds Nm1 and Nm2 of the motors MG1 and MG2, the intake air temperature Ta, the atmospheric pressure Pa from the atmospheric pressure sensor 89, the charge-discharge power demand Pb*, the charge-discharge electric power Pb, and an input limit Win and an output limit Wout of the battery 50 (step S100). The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The intake air temperature Ta is measured by the temperature sensor 149 and is received from the engine ECU 24 by communication. The charge-discharge power demand Pb* is set based on the state of charge SOC of the battery 50 and is received from the battery ECU 52 by communication. The input limit Win and the output limit Wout of the battery 50 are set based on the battery temperature Tb of the battery 50 measured by the temperature sensor 51 and the state of charge SOC of the battery 50 and are received from the battery ECU 52 by communication. A concrete procedure of setting the input and output limits Win and Wout of the battery 50 sets base values of the input limit Win and the output limit Wout corresponding to the battery temperature Tb, specifies an input limit correction factor and an output limit correction factor corresponding to the state of charge SOC of the battery 50, and multiplies the base values of the input limit Win and the output limit Wout by the specified input limit correction factor and output limit correction factor to determine the input limit Win and the output limit Wout of the battery 50. FIG. 4 shows variations of the input limit Win and the output limit Wout against the battery temperature Tb. FIG. 5 shows variations of the input limit correction factor and the output limit correction factor against the state of charge SOC of the battery 50.

After the data input, the CPU 72 identifies whether the hybrid vehicle 20 is in steady state, based on the input accelerator opening Acc and the vehicle speed V (step S110). When the hybrid vehicle 20 is in the steady state (step S110: yes), the charge-discharge power demand Pb* is adjusted according to a feedback relational expression of Equation (1) given below, in order to cancel out the difference between the input charge-discharge power demand Pb* and the input charge-discharge electric power Pb (step S120):

$$Pb^* \leftarrow Pb^* + kb1 \cdot (Pb^* - Pb) + kb2 \int (Pb^* - Pb)dt \quad (1)$$

Such adjustment of the charge-discharge power demand Pb* makes the charge-discharge electric power Pb, which is actually charged into and discharged from the battery 50, approach to the charge-discharge power demand Pb* and optimizes the electric power balance of the hybrid vehicle 20. Here the steady state represents a cruise drive state with no substantial variation in accelerator opening Acc over a preset time period and with a certain variation in vehicle speed V in a specified range over a preset time period. In Equation (1) given above, 'kb1' in the second term and 'kb2' in the third term on the right side respectively denote a gain of the proportional and a gain of the integral term.

Figure 6:
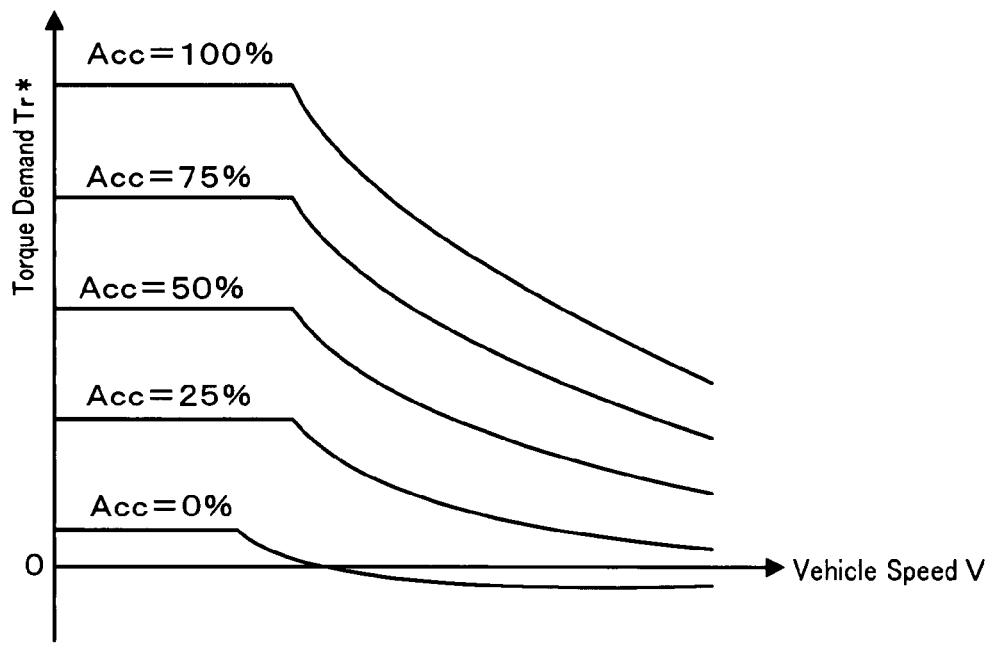
FIG. 6 shows one example of a torque demand setting map.

The CPU 72 subsequently sets a torque demand Tr* to be output to the ring gear shaft 32a or driveshaft linked with the drive wheels 63a and 63b as a torque required for the hybrid vehicle 20 and a power demand P* required for the hybrid vehicle 20, based on the input accelerator opening Acc and the input vehicle speed V (step S130). A concrete procedure of setting the torque demand Tr* in this embodiment stores in advance variations in torque demand Tr* against the accelerator opening Acc and the vehicle speed V as a torque demand setting map in the ROM 74 and reads the torque demand Tr* corresponding to the given accelerator opening Acc and the given vehicle speed V from this torque demand setting map. One example of the torque demand setting map is shown in FIG. 6. The power demand P* is calculated as the sum of the product of the torque demand Tr* and a rotation speed Nr of the ring gear shaft 32a, the charge-discharge power demand Pb* to be charged into or discharged from the battery 50, and a potential loss. The rotation speed Nr of the ring gear shaft 32a is obtained by multiplying the vehicle speed V by a preset conversion factor k or by dividing the rotation speed Nm2 of the motor MG2 by a gear ratio Gr of the reduction gear 35.

Figure 7:
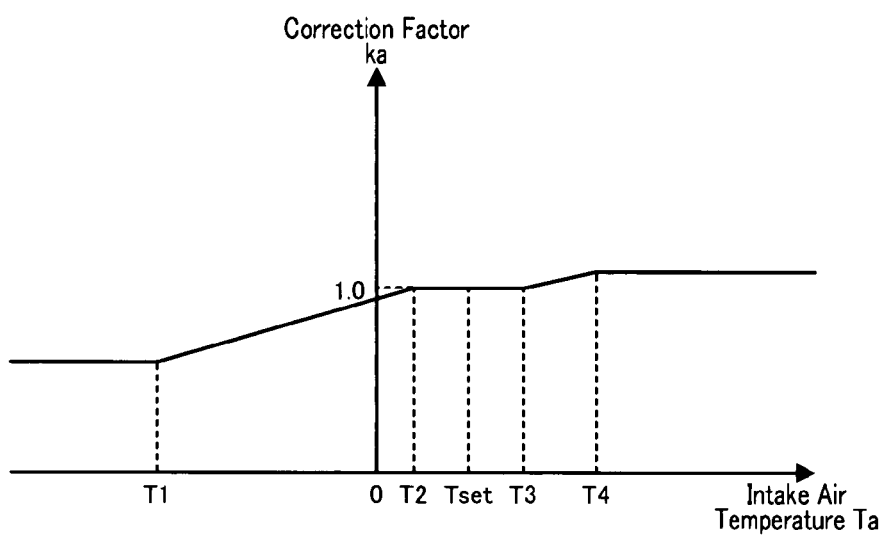
FIG. 7 shows a plot of correction factor ka against intake air temperature Ta.
Figure 8:
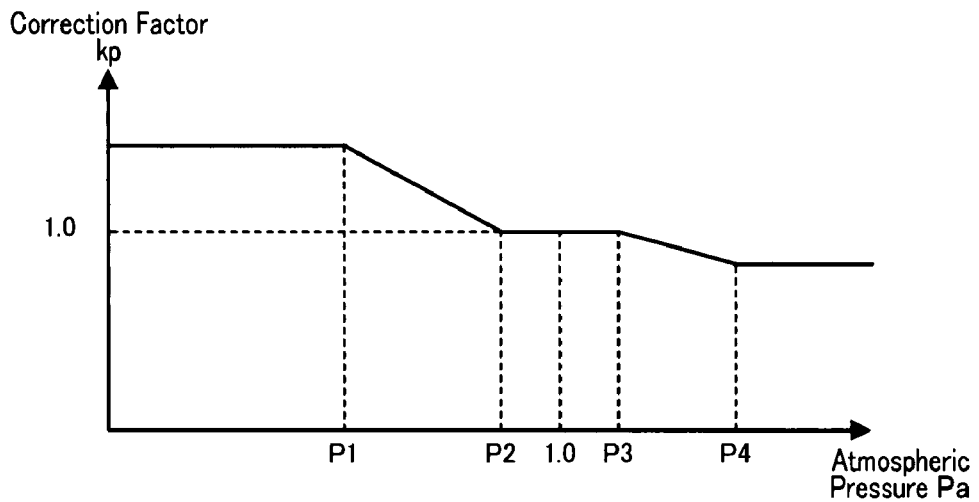
FIG. 8 shows a plot of correction factor kp against atmospheric pressure Pa.

The CPU 72 then sets a correction coefficient keg based on the intake air temperature Ta and the atmospheric pressure Pa reflecting the density of the intake air supplied to the engine 22 (step S140), and multiplies the set power demand P* by the set correction coefficient keg to determine a target engine power Pe*, which is to be output from the engine 22 (step S150). Namely the target engine power Pe* is set by correcting the power demand P* with the correction coefficient keg reflecting the density of the intake air. The output power of the engine 22 varies with a variation in density of the intake air even under the conditions of a fixed engine rotation speed and a fixed throttle opening. The correction of the embodiment compensates for this varying output power of the engine 22. A concrete procedure of setting the correction coefficient keg in this embodiment first sets a correction factor ka corresponding to the intake air temperature Ta and a correction factor kp corresponding to the atmospheric pressure Pa and multiplies the set correction factor ka by the set correction factor kp to determine the correction coefficient keg. A plot of the correction factor ka against the intake air temperature Ta is given as one example in FIG. 7. A plot of the correction factor kp against the atmospheric pressure Pa is given as one example in FIG. 8. In the example of FIG. 7, the correction factor ka is fixed to 1.0 in a range of the intake air temperature Ta that increases from a temperature T2 to a temperature T3 and includes a standard temperature Tset (for example, 25° C.). The correction factor ka is set to decrease with a decrease in intake air temperature Ta from the temperature T2 to a temperature T1. The correction factor ka is set to increase with an increase in intake air temperature Ta from the temperature T3 to a temperature T4. The correction factor ka is fixed to the value at the temperature T1 in a range of the intake air temperature Ta of lower than the temperature T1. The correction factor ka is fixed to the value at the temperature T4 in a range of the intake air temperature Ta of higher than the temperature T4. The temperatures T2 and T3 define a dead zone of keeping the correction factor ka fixed to the value at the standard temperature Tset. The correction factor ka at the temperature T1 specifies the lower limit, and the correction factor ka at the temperature T4 specifies the upper limit. The lower intake air temperature Ta gives the higher air density and results in the greater output power of the engine 22. The procedure of the embodiment thus sets the smaller correction factor ka against the lower intake air temperature Ta to adjust the output power of the engine 22. Such setting of the dead zone and the upper and lower limits desirably prevents excessive correction based on the intake air temperature Ta. In the example of FIG. 8, the correction factor kp is fixed to 1.0 in a range of the atmospheric pressure Pa that increases from a pressure P2 to a pressure P3 and includes a standard pressure (for example, 1 atmospheric pressure). The correction factor kp is set to increase with a decrease in atmospheric pressure Pa from the pressure P2 to a pressure P1. The correction factor kp is set to decrease with an increase in atmospheric pressure Pa from the pressure P3 to a pressure P4. The correction factor kp is fixed to the value at the pressure P1 in a range of the atmospheric pressure Pa of lower than the pressure P1. The correction factor kp is fixed to the value at the pressure P4 in a range of the atmospheric pressure Pa of higher than the pressure P4. The pressures P2 and P3 define a dead zone of keeping the correction factor kp fixed to the value at the standard pressure (1 atmospheric pressure). The correction factor kp at the pressure P1 specifies the upper limit, and the correction factor kp at the pressure P4 specifies the lower limit. The lower atmospheric pressure Pa gives the lower air density and results in the smaller output power of the engine 22. The procedure of the embodiment thus sets the greater correction factor kp against the lower atmospheric pressure Pa to adjust the output power of the engine 22. Such setting of the dead zone and the upper and lower limits desirably prevents excessive correction based on the atmospheric pressure Pa.

Figure 9:
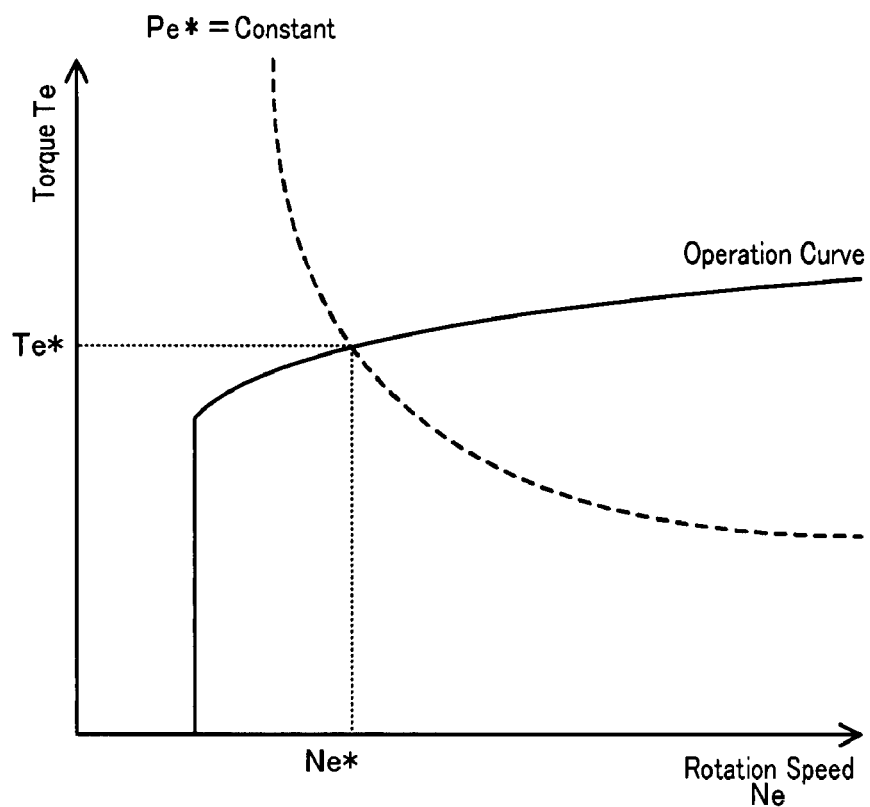
FIG. 9 shows an efficient operation curve of the engine to set a target rotation speed Ne* and a target torque Te*.

The CPU 72 subsequently sets a target rotation speed Ne* and a target torque Te* of the engine 22 corresponding to the target engine power Pe* (step S160). The target rotation speed Ne* and the target torque Te* of the engine 22 are determined according to an efficient operation curve of ensuring efficient operations of the engine 22 and a curve of the target engine power Pe*. FIG. 9 shows an efficient operation curve of the engine 22 to set the target rotation speed Ne* and the target torque Te*. As clearly shown in FIG. 9, the target rotation speed Ne* and the target torque Te* are given as an intersection of the efficient operation curve and a curve of constant target engine power Pe* (=Ne*×Te*).

The CPU 72 calculates a target rotation speed Nm1* of the motor MG1 from the target rotation speed Ne* of the engine 22, the rotation speed Nr (=Nm2/Gr) of the ring gear shaft 32a, and a gear ratio ρ of the power distribution integration mechanism 30 according to Equation (2) given below, while calculating a torque command Tm1* of the motor MG1 from the calculated target rotation speed Nm1* and the current rotation speed Nm1 of the motor MG1 according to Equation (3) given below (step S170):

$$Nm1^* = Ne^* \cdot (1+\rho)/\rho - Nm2/(Gr \cdot \rho) \quad (2)$$

$$Tm1^* = \text{Previous} Tm1^* + k1(Nm1^* - Nm1) + k2\int(Nm1^* - Nm1)dt \quad (3)$$

Figure 10:
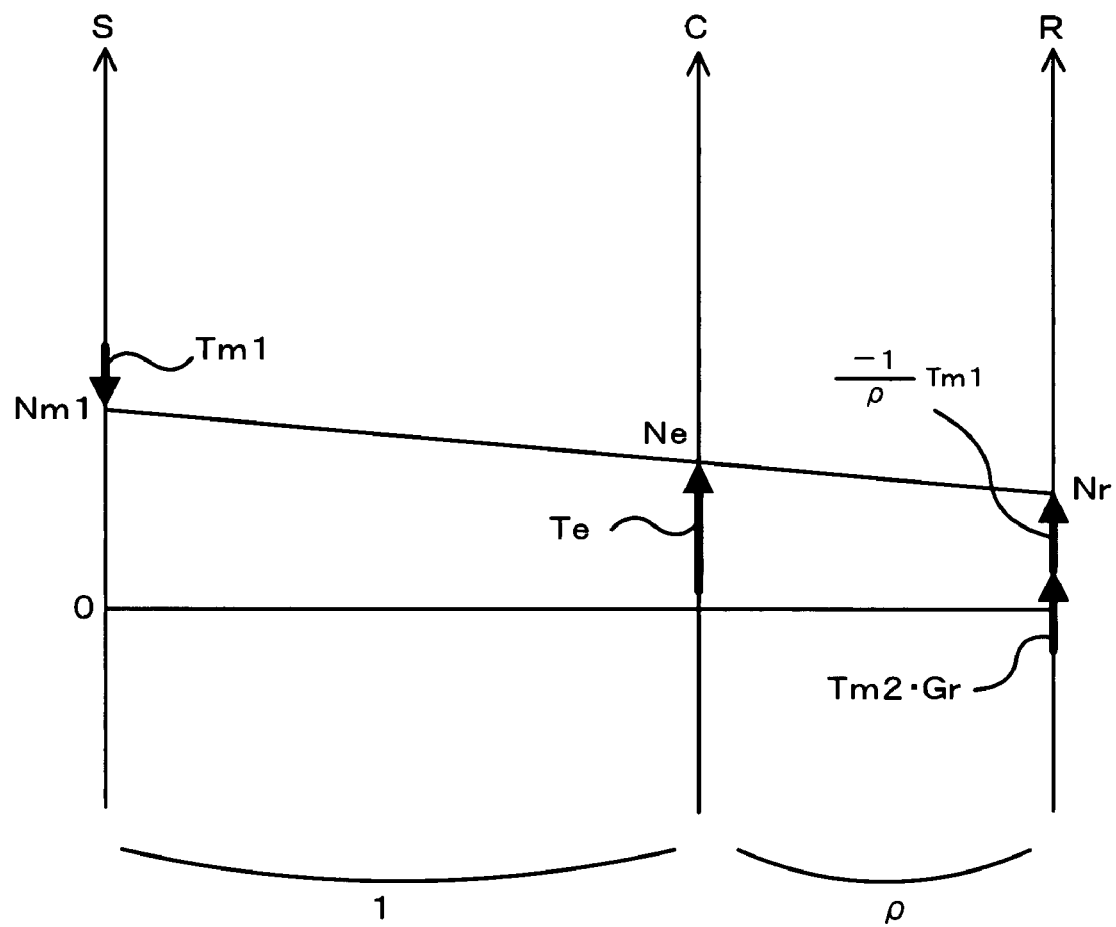
FIG. 10 is an alignment chart showing torque-rotation speed dynamics of respective rotational elements of a power distribution integration mechanism included in the hybrid vehicle of the embodiment.

Equation (2) is a dynamic relational expression of the rotation elements included in the power distribution integration mechanism 30. FIG. 10 is an alignment chart showing torque-rotation speed dynamics of the respective rotation elements included in the power distribution integration mechanism 30. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by the gear ratio Gr of the reduction gear 35. Equation (2) is readily introduced from the alignment chart of FIG. 10. Two upward thick arrows on the axis 'R' in FIG. 10 respectively show a torque applied to the ring gear shaft 32a when a torque Tm1 is output from the motor MG1, and a torque applied to the ring gear shaft 32a via the reduction gear 35 when a torque Tm2 is output from the motor MG2. Equation (3) is a relational expression of feedback control to drive and rotate the motor MG1 at the target rotation speed Nm1*. In Equation (3) given above, 'k1' in the second term and 'k2' in the third term on the right side respectively denote a gain of the proportional and a gain of the integral term.

After calculation of the target rotation speed Nm1* and the torque command Tm1* of the motor MG1, the CPU 72 calculates a lower torque restriction Tmin and an upper torque restriction Tmax as minimum and maximum torques that may be output from the motor MG2, according to Equations (4) and (5) given below (step S180):

$$T\min=(W\text{in}-Tm1^*\cdot Nm1)/Nm2 \quad (4)$$

$$T\max=(W\text{out}-Tm1^*\cdot Nm1)/Nm2 \quad (5)$$

The lower torque restriction Tmin is given by dividing a difference between the input limit Win of the battery 50 and power consumption (power generation) of the motor MG1, which is the product of the torque command Tm1* and the input current rotation speed Nm1 of the motor MG1, by the input current rotation speed Nm2 of the motor MG2. The upper torque restriction Tmax is given by dividing a difference between the output limit Wout of the battery 50 and the power consumption (power generation) of the motor MG1 by the input current rotation speed Nm2 of the motor MG2. The CPU 72 then calculates a tentative motor torque Tm2tmp to be output from the motor MG2 from the torque demand Tr*, the torque command Tm1* of the motor MG1, the gear ratio ρ of the power distribution integration mechanism 30, and the gear ratio Gr of the reduction gear 35 according to Equation (6) given below (step S190):

$$Tm2tmp=(Tr^*+Tm1^*/\rho)/Gr \quad (6)$$

The CPU 72 limits the tentative motor torque Tm2tmp to the range between the calculated lower torque restriction Tmin and upper torque restriction Tmax to set a torque command Tm2* of the motor MG2 (step S200). Setting the torque command Tm2* of the motor MG2 in this manner restricts the torque demand Tr* to be output to the ring gear shaft 32a or the driveshaft within the range of the input limit Win and the output limit Wout of the battery 50. Equation (6) is readily introduced from the alignment chart of FIG. 10.

After setting the target rotation speed Ne* and the target torque Te* of the engine 22 and the torque commands Tm1* and Tm2* of the motors MG1 and MG2, the CPU 72 sends the target rotation speed Ne* and the target torque Te* of the engine 22 to the engine ECU 24 and the torque commands Tm1* and Tm2* of the motors MG1 and MG2 to the motor ECU 40 (step S210) and exits from the drive control routine of FIG. 3. The engine ECU 24 receives the settings of the target rotation speed Ne* and the target torque Te* and performs intake air flow regulation, fuel injection control, and ignition control of the engine 22 to drive the engine 22 at a specified drive point of the target rotation speed Ne* and the target torque Te*. The motor ECU 40 receives the settings of the torque commands Tm1* and Tm2* and performs switching control of the switching elements included in the respective inverters 41 and 42 to drive the motor MG1 with the torque command Tm1* and the motor MG2 with the torque command Tm2*.

In the state of the high intake air density induced by the low intake air temperature Ta or by the high atmospheric pressure Pa, the correction coefficient keg is set to be smaller than the value 1.0. The set target engine power Pe* is accordingly smaller than the power demand P*. The engine 22 and the motors MG1 and MG2 are controlled to ensure output of this smaller target engine power Pe* from the engine 22 and output of the torque demand Tr*. In the case where the control of the engine 22 is based on the standard temperature Tset and the standard pressure (1 atmospheric pressure), the power output from the engine 22 is equivalent to the power demand P*, which is greater than the target engine power Pe*. This leads to output of an unexpectedly large power from the engine 22 in the state of the high intake air density and causes excessive charge of the battery 50 with the excess electric power. The drive control of the embodiment effectively prevents the battery 50 from being excessively charged with the excess electric power under the condition of the high density of the intake air. In the state of the low intake air density induced by the high intake air temperature Ta or by the low atmospheric pressure Pa, on the other hand, the correction coefficient keg is set to be greater than the value 1.0. The set target engine power Pe* is accordingly greater than the power demand P*. The engine 22 and the motors MG1 and MG2 are controlled to ensure output of this greater target engine power Pe* from the engine 22 and output of the torque demand Tr*. In the case where the control of the engine 22 is based on the standard temperature Tset and the standard pressure (1 atmospheric pressure), the power output from the engine 22 is equivalent to the power demand P*, which is smaller than the target engine power Pe*. This leads to output of only an insufficient power from the engine 22 in the state of the low intake air density and causes excessive discharge of the battery 50 to supply the excess electric power. The drive control of the embodiment effectively prevents the battery 50 from being excessively discharged to supply the excess electric power under the condition of the low density of the intake air.

In the hybrid vehicle 20 of the embodiment described above, the drive control corrects the power demand P* required for the hybrid vehicle 20 based on the intake air temperature Ta and the atmospheric pressure Pa reflecting the density of the intake air supplied to the engine 22 and thereby sets the target engine power Pe* to be output from the engine 22. The engine 22 ad the motors MG1 and MG2 are then controlled to ensure output of the engine power demand Pe* from the engine 22 and output of the torque demand Tr*. The varying density of the intake air may cause output of excessive power from the engine 22 or output of insufficient power from the engine 22. The battery 50 is charged or discharged to compensate for the excessive power output from the engine 22 or for the insufficient power output from the engine 22. The drive control of the embodiment effectively deals with the environmental change and prevents the battery 50 from being excessively charged with an unexpectedly high electric power or from being excessively discharged to supply an unexpectedly high electric power. The correction factor ka and the correction factor kp used for calculation of the correction coefficient keg, which is multiplied by the power demand P* to set the target engine power Pe*, respectively have the dead zone and the upper and lower limits against the varying intake air temperature Ta and the dead zone and the upper and lower limits against the varying atmospheric pressure Pa. Such setting desirably prevents excessive correction based on the intake air temperature Ta or based on the atmospheric pressure Pa and enables setting of the adequate target engine power Pe*. The charge-discharge power demand Pb* is adjusted according to the accelerator opening Acc and the vehicle speed V, only when the hybrid vehicle 20 is in the steady state. Such adjustment of the charge-discharge power demand Pb* makes the charge-discharge electric power Pb, which is actually charged into and discharged from the battery 50, approach to the charge-discharge power demand Pb* and optimizes the electric power balance of the hybrid vehicle 20.

In the hybrid vehicle 20 of the embodiment, the correction coefficient keg is set based on the intake air temperature Ta and the atmospheric pressure Pa reflecting the density of the intake air. Such setting is, however, not essential. For example, the correction coefficient keg may be set based on only the intake air temperature Ta, irrespective of the variation in atmospheric pressure Pa. In another example, the correction coefficient keg may be set based on only the atmospheric pressure Pa, irrespective of the variation in intake air temperature Ta. The correction coefficient keg may otherwise be set based on the directly measured density of the intake air or based on the computed density of the intake air from the intake air temperature Ta and the atmospheric pressure Pa.

In the hybrid vehicle 20 of the embodiment, the correction factor ka used for specification of the correction coefficient keg has the dead zone of the fixed value in the middle range of the intake air temperature Ta including the standard temperature Tset and specifies the lower limit in the range of the intake air temperature Ta of lower than the temperature T1 and the upper limit in the range of the intake air temperature Ta of higher than the temperature T4. The dead zone and the upper and the lower limits are, however, not essential and may be omitted when not required. In the hybrid vehicle 20 of the embodiment, the correction factor kp used for specification of the correction coefficient keg has the dead zone of the fixed value in the middle range of the atmospheric pressure Pa including the standard pressure (1 atmospheric pressure) and specifies the lower limit in the range of the atmospheric pressure Pa of higher than the pressure P4 and the upper limit in the range of the atmospheric pressure Pa of lower than the pressure P1. The dead zone and the upper and the lower limits are, however, not essential and may be omitted when not required.

The drive control of the embodiment adjusts the charge-discharge power demand Pb* when it is determined that the hybrid vehicle 20 is in the steady state, based on the accelerator opening Acc and the vehicle speed V. One possible modification may adjust the charge-discharge power demand Pb*, regardless of whether the hybrid vehicle is in the steady state or in the non-steady state. Another possible modification may not perform adjustment of the charge-discharge power demand Pb* even when the hybrid vehicle is in the steady state.

Figure 11:
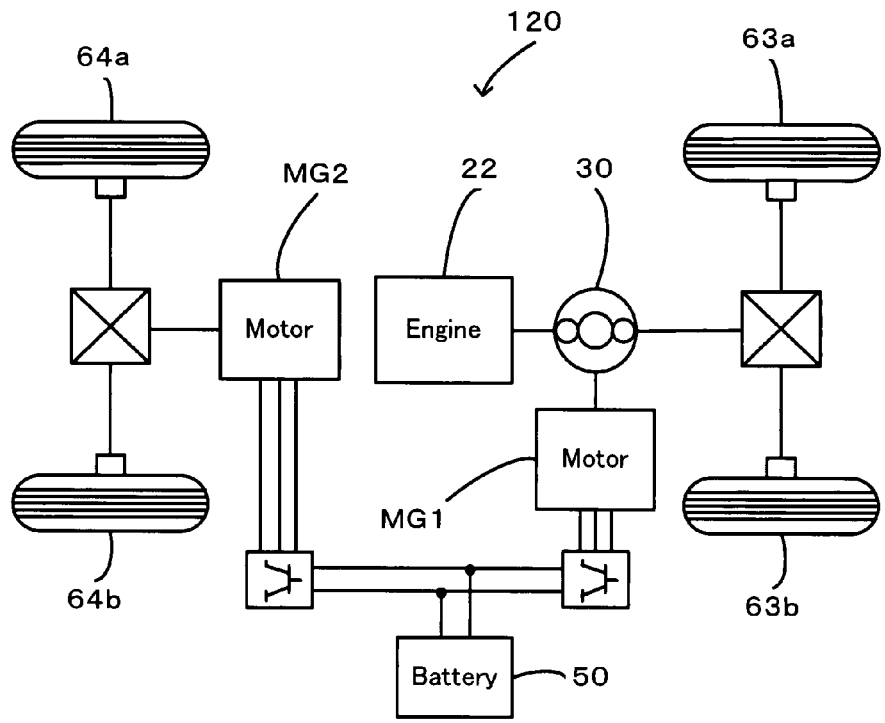
FIG. 11 schematically illustrates the configuration of another hybrid vehicle in one modified example.

In the hybrid vehicle 20 of the embodiment, the power of the motor MG2 is subjected to gear change by the reduction gear 35 and is output to the ring-gear shaft 32a. In one possible modification shown as a hybrid vehicle 120 of FIG. 11, the power of the motor MG2 may be output to another axle (that is, an axle linked with wheels 64a and 64b), which is different from an axle connected with the ring gear shaft 32a (that is, an axle linked with the wheels 63a and 63b).

Figure 12:
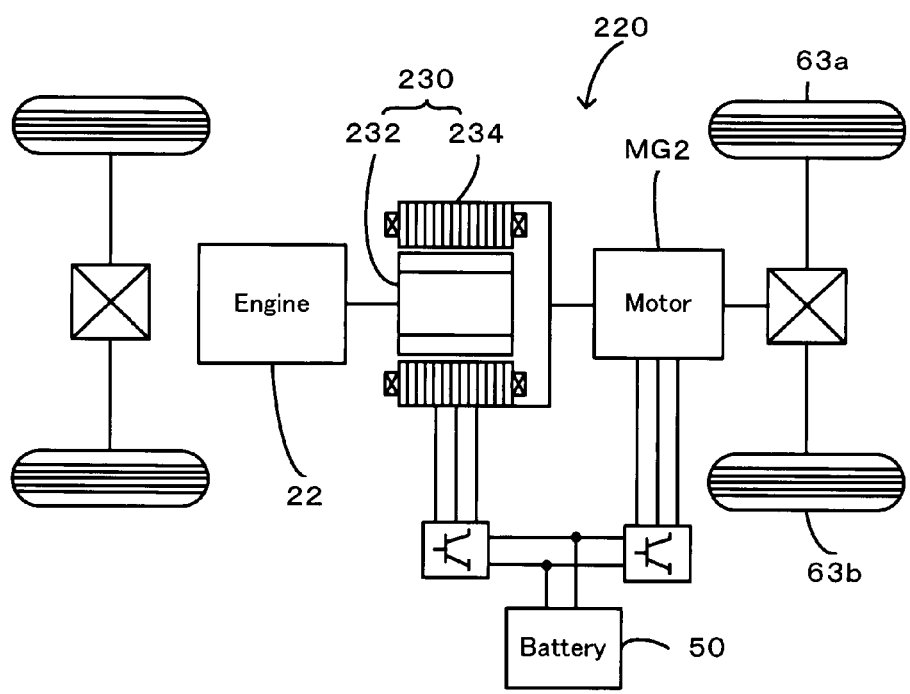
FIG. 12 schematically illustrates the configuration of still another hybrid vehicle in another modified example.

In the hybrid vehicle 20 of the embodiment, the power of the engine 22 is output via the power distribution integration mechanism 30 to the ring gear shaft 32a functioning as the drive shaft linked with the drive wheels 63a and 63b. In another possible modification of FIG. 12, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

The embodiment regards the hybrid vehicle 20 equipped with the power output apparatus as one application of the invention. The application of the present invention is, however, not restricted to the power output apparatus mounted on the hybrid vehicle. The power output apparatus of the invention may be mounted on any of various moving bodies including motor vehicles and diversity of other vehicles, boats and ships, and aircraft or may be built in stationary equipment, such as construction machines. The technique of the invention is also attainable as a control method of the power output apparatus.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The technique of the invention is preferably applied to the manufacturing industries of power output apparatuses and motor vehicles and other relevant industries.

The invention claimed is:

1. A power output apparatus that outputs power to a driveshaft, said power output apparatus comprising:
    an internal combustion engine;
    an electric power-mechanical power input output mechanism that is connected with an output shaft of the internal combustion engine and with the driveshaft and inputs and outputs power from and to the output shaft and the driveshaft through input and output of electric power and mechanical power;
    a motor that is capable of inputting and outputting power from and to the driveshaft;
    an accumulator unit that transmits electric power to and from the electric power-mechanical power input output mechanism and the motor;
    a charge-discharge power demand setting module that sets a charge-discharge power demand, which is to be charged into or discharged from the accumulator unit;
    an input/output limits setting module that sets input and output limits of the accumulator unit as chargeable and dischargeable electric powers in and from the accumulator unit;
    an air density-affecting physical quantity detection unit that detects a physical quantity, which affects density of the air taken into the internal combustion engine;
    a driving force demand setting module that sets a driving force demand required for the driveshaft;
    a target drive point setting module that specifies a tentative power demand to be output from the internal combustion engine corresponding to the set driving force demand and the set charge-discharge power demand, specifies the tentative power demand to a target power when the detected air density-affecting physical quantity is in a preset first range including a standard quantity, while correcting the specified tentative power demand with a correction factor based on the detected air density-affecting physical quantity to set the target power when the detected air density-affecting physical quantity is out of the preset first range, and sets a target drive point of the internal combustion engine as a combination of a target rotation speed and a target torque of the internal combustion engine based on the set target power and an efficient operation restriction for efficient operation; and a control module that controls the internal combustion engine, the electric power-mechanical power input output mechanism, and the motor to drive the internal combustion engine at the set target drive point in a range of the input limit and the output limit and to ensure output of a driving force equivalent to the set driving force demand to the driveshaft.

2. A power output apparatus in accordance with claim 1, wherein the air density-affecting physical quantity detection unit includes a temperature measurement unit that measures temperature of the air taken into the internal combustion engine.

3. A power output apparatus in accordance with claim 1, wherein the air density-affecting physical quantity detection unit includes an atmospheric pressure measurement unit that measures atmospheric pressure.

4. A power output apparatus in accordance with claim 1, wherein when the detected air density-affecting physical quantity is out of a preset second range including a standard quantity, the target drive point setting module sets the target power with specification of the detected air density-affecting physical quantity as a boundary of the preset second range.

5. A power output apparatus in accordance with claim 1, wherein the control module sets a target operation condition of the electric power-mechanical power input output mechanism to drive the internal combustion engine at a rotation speed of the set target drive point, and controls the electric power-mechanical power input output mechanism to be driven in the set target operation condition.

6. A power output apparatus in accordance with claim 5, said power output apparatus further comprising:
a rotation speed detection unit that detects a rotation speed of the internal combustion engine,
wherein the control module performs feedback control of the electric power-mechanical power input output mechanism to cancel out a difference between the rotation speed of the set target drive point and the detected rotation speed of the internal combustion engine.

7. A power output apparatus in accordance with claim 1, said power output apparatus further comprising:
a charge-discharge electric power detection unit that detects a charge-discharge electric power, which is actually charged into or discharged from the accumulator unit,
wherein the charge-discharge power demand setting module sets the charge-discharge power demand with a correction based on the detected charge-discharge electric power, upon satisfaction of a preset condition.

8. A power output apparatus in accordance with claim 7, wherein the preset condition is that the driveshaft is in a substantially steady driving state.

9. A power output apparatus in accordance with claim 1, wherein the electric power-mechanical power input output mechanism comprises:
a three shaft-type power input output module that is linked to three shafts, the output shaft of the internal combustion engine, the driveshaft, and a rotating shaft, and inputs and outputs power from and to a residual one shaft based on powers input from and output to any two shafts among the three shafts; and
a generator that inputs and outputs power from and to the rotating shaft.

10. A vehicle, comprising:
an internal combustion engine;
an electric power-mechanical power input output mechanism that is connected with an output shaft of the internal combustion engine and with the driveshaft linked to an axle and inputs and outputs power from and to the output shaft and the driveshaft through input and output of electric power and mechanical power;
a motor that is capable of inputting and outputting power from and to the driveshaft;
an accumulator unit that transmits electric power to and from the electric power-mechanical power input output mechanism and the motor;
a charge-discharge power demand setting module that sets a charge-discharge power demand, which is to be charged into or discharged from the accumulator unit;
an input/output limits setting module that sets input and output limits of the accumulator unit as chargeable and dischargeable electric powers in and from the accumulator unit;
an air density-affecting physical quantity detection unit that detects a physical quantity, which affects density of the air taken into the internal combustion engine;
a driving force demand setting module that sets a driving force demand required for the driveshaft;
a target drive point setting module that specifies a tentative power demand to be output from the internal combustion engine corresponding to the set driving force demand and the set charge-discharge power demand, specifies the tentative power demand to a target power when the detected air density-affecting physical quantity is in a preset first range including a standard quantity, while correcting the specified tentative power demand with a correction factor based on the detected air density-affecting physical quantity to set the target power when the detected air density-affecting physical quantity is out of the preset first range, and sets a target drive point of the internal combustion engine as a combination of a target rotation speed and a target torque of the internal combustion engine based on the set target power and an efficient operation restriction for efficient operation; and
a control module that controls the internal combustion engine, the electric power-mechanical power input output mechanism, and the motor to drive the internal combustion engine at the set target drive point in a range of the input limit and the output limit and to ensure output of a driving force equivalent to the set driving force demand to the driveshaft.

11. A control method of a power output apparatus, said power output apparatus having: an internal combustion engine; an electric power-mechanical power input output mechanism that is connected with an output shaft of the internal combustion engine and with the driveshaft and inputs and outputs power from and to the output shaft and the driveshaft through input and output of electric power and mechanical power; a motor that is capable of inputting and outputting power from and to the driveshaft; and an accumulator unit that transmits electric power to and from the electric power-mechanical power input output mechanism and the motor, said control method specifying a tentative power demand to be output from the internal combustion engine corresponding to the set driving force demand and the set charge-discharge power demand, specifying the tentative power demand to a target power when an air density-affecting physical quantity that affects density of the air taken into the internal combustion engine is in a preset first range including a standard quantity, while correcting the specified tentative power demand with a correction factor based on the air density-affecting physical quantity to set the target power when the air density-affecting physical quantity is out of the preset first range, and setting a target drive point of the internal combustion engine as a combination of a target rotation speed and a target torque of the internal combustion engine based on the set target power and an efficient operation restriction for efficient operation of the internal combustion engine, said control method controlling the internal combustion engine, the electric power-mechanical power input output mechanism, and the motor to drive the internal combustion engine at the set target drive point in a range of an input limit and an output limit, which are set as chargeable and dischargeable electric powers in and from the accumulator unit, and to ensure output of a driving force equivalent to the set driving force demand to the driveshaft.

12. A control method of a power output apparatus in accordance with claim 11, wherein the air density-affecting physical quantity includes temperature of the air taken into the internal combustion engine or atmospheric pressure.

13. A control method of a power output apparatus in accordance with claim 11, when the air density-affecting physical quantity is out of a preset second range including a standard quantity, said control method setting the target power with specification of the air density-affecting physical quantity as a boundary of the preset second range.

14. A control method of a power output apparatus in accordance with claim 11, said control method setting a target operation condition of the electric power-mechanical power input output mechanism to drive the internal combustion engine at a rotation speed of the set target drive point, and controlling the electric power-mechanical power input output mechanism to be driven in the set target operation condition.

15. A control method of a power output apparatus in accordance with claim 14, said control method performing feedback control of the electric power-mechanical power input output mechanism to cancel out a difference between the rotation speed of the set target drive point and the rotation speed of the internal combustion engine.

* * * * *

UNITED STATES PATENT AND TRADEMARK OFFICE
CERTIFICATE OF CORRECTION

PATENT NO. : 7,918,762 B2
APPLICATION NO. : 11/920772
DATED : April 5, 2011
INVENTOR(S) : Koichiro Muta et al.

It is certified that error appears in the above-identified patent and that said Letters Patent is hereby corrected as shown below:

| Column | Line | |
|---|---|---|
| 9 | 53 | Change "driver Is" to --driver's--. |

Signed and Sealed this
Twenty-fifth Day of October, 2011

David J. Kappos
*Director of the United States Patent and Trademark Office*